(12) United States Patent
Marcous et al.

(10) Patent No.: US 11,562,334 B2
(45) Date of Patent: Jan. 24, 2023

(54) SYSTEMS AND METHODS FOR REAL-TIME ACCOUNT ACCESS

(71) Applicant: PayNet Payments Network, LLC, Jacksonville, FL (US)

(72) Inventors: Neil Marcous, Bay Head, NJ (US); Robert Woodbury, Flemington, NJ (US); Peter Gordon, Sharon, MA (US)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

(21) Appl. No.: 15/931,564

(22) Filed: May 13, 2020

(65) Prior Publication Data

US 2020/0273004 A1 Aug. 27, 2020

Related U.S. Application Data

(63) Continuation of application No. 16/715,818, filed on Dec. 16, 2019, which is a continuation of application
(Continued)

(51) Int. Cl.
*G06Q 20/10* (2012.01)
*G06Q 20/40* (2012.01)
(Continued)

(52) U.S. Cl.
CPC ............ *G06Q 20/10* (2013.01); *G06Q 20/12* (2013.01); *G06Q 20/20* (2013.01); *G06Q 20/385* (2013.01); *G06Q 20/40* (2013.01)

(58) Field of Classification Search
None
See application file for complete search history.

(56) References Cited

U.S. PATENT DOCUMENTS

| 5,809,144 A | 9/1998 | Sirbu et al. |
| 5,826,241 A | 10/1998 | Stein et al. |

(Continued)

FOREIGN PATENT DOCUMENTS

| CN | 20068004056.3 | 10/2009 |
| KR | 20010008292 | 2/2001 |

(Continued)

OTHER PUBLICATIONS

Lade, D. C. (Oct. 17, 2006). Take care to protect your money from check fraud. McClatchy—Tribune Business News Retrieved from https://dialog.proquest.com/professional/docview/463229497?accountid=131444 on Sep. 7, 2022 (Year: 2006).*

(Continued)

*Primary Examiner* — Kito R Robinson
(74) *Attorney, Agent, or Firm* — Finnegan, Henderson, Farabow, Garrett & Dunner LLP

(57) ABSTRACT

Systems and methods for real-time account access, allowing access to accounts (such as deposit, credit, or debit accounts) through network processing infrastructures such as Electronic Funds Transfer (EFT). In some embodiments, consumers and/or merchants are able to effect transaction requests against accounts, using a pseudo-identifier or other identifier, and without the need to provide an account number or card number. In other embodiments, payment networks are able to route and process transaction requests against accounts, without having a card number or account number. In other embodiments, account processing systems are able to determine an appropriate account based on transaction requests that do not contain card numbers or account numbers.

20 Claims, 5 Drawing Sheets

Related U.S. Application Data

No. 13/835,452, filed on Mar. 15, 2013, now Pat. No. 10,552,807.

(60) Provisional application No. 61/612,897, filed on Mar. 19, 2012.

(51) Int. Cl.
*G06Q 20/12* (2012.01)
*G06Q 20/20* (2012.01)
*G06Q 20/38* (2012.01)

(56) References Cited

U.S. PATENT DOCUMENTS

| | | | |
|---|---|---|---|
| 5,878,141 | A | 3/1999 | Daly et al. |
| 5,949,044 | A | 9/1999 | Walker |
| 6,047,268 | A | 4/2000 | Bartoli et al. |
| 6,173,272 | B1* | 1/2001 | Thomas .............. G06Q 20/00 705/42 |
| 6,202,054 | B1 | 3/2001 | Lawlor |
| 6,233,327 | B1 | 5/2001 | Petite |
| 6,715,679 | B1 | 4/2004 | Infosino |
| 6,879,965 | B2 | 4/2005 | Fung |
| 7,229,014 | B1 | 6/2007 | Snyder |
| 7,644,037 | B1 | 1/2010 | Ostrovsky |
| 7,793,829 | B2 | 9/2010 | Randazza et al. |
| 7,805,378 | B2 | 9/2010 | Berardi |
| 7,831,490 | B2 | 11/2010 | Modigliani et al. |
| 7,945,511 | B2 | 5/2011 | O'Brien et al. |
| 7,988,040 | B2 | 8/2011 | Randazza et al. |
| 8,041,646 | B2 | 10/2011 | Bajan |
| 8,205,791 | B2 | 6/2012 | Randazza et al. |
| 8,271,381 | B2 | 9/2012 | O'Brien et al. |
| 8,322,606 | B2 | 12/2012 | Ong |
| 8,393,536 | B2 | 3/2013 | Randazza et al. |
| 8,490,865 | B2 | 7/2013 | Randazza et al. |
| 8,543,495 | B1 | 9/2013 | Bajan |
| 8,571,980 | B1 | 10/2013 | Greenwood |
| 9,524,501 | B2 | 12/2016 | Weber |
| 10,043,178 | B2 | 8/2018 | Carlson |
| 2001/0032139 | A1 | 10/2001 | Debonnett |
| 2001/0034717 | A1 | 10/2001 | Whitworth |
| 2001/0034720 | A1 | 10/2001 | Armes |
| 2002/0007320 | A1 | 1/2002 | Hogan |
| 2002/0116341 | A1 | 8/2002 | Hogan |
| 2002/0123972 | A1 | 9/2002 | Hodgson |
| 2002/0133467 | A1 | 9/2002 | Hobson et al. |
| 2002/0178071 | A1 | 11/2002 | Walker |
| 2003/0023552 | A1 | 1/2003 | Kight |
| 2003/0126094 | A1 | 7/2003 | Fisher |
| 2004/0044739 | A1 | 3/2004 | Ziegler |
| 2004/0133516 | A1 | 7/2004 | Buchanan |
| 2004/0230539 | A1 | 11/2004 | Praisner |
| 2004/0260646 | A1 | 12/2004 | Berardi |
| 2005/0027618 | A1 | 2/2005 | Zucker |
| 2005/0171898 | A1 | 8/2005 | Bishop et al. |
| 2005/0246293 | A1 | 11/2005 | Ong |
| 2006/0026098 | A1 | 2/2006 | Peckover |
| 2006/0149686 | A1 | 7/2006 | Debonnett |
| 2007/0022021 | A1 | 1/2007 | Walker |
| 2007/0150411 | A1* | 6/2007 | Addepalli ............. G06Q 30/02 705/39 |
| 2007/0192245 | A1 | 8/2007 | Fisher et al. |
| 2007/0282690 | A1 | 12/2007 | Randazza |
| 2008/0167017 | A1 | 7/2008 | Wentker et al. |
| 2008/0313047 | A1 | 12/2008 | Casares |
| 2008/0319869 | A1 | 12/2008 | Carlson |
| 2008/0319905 | A1 | 12/2008 | Carlson |
| 2009/0065572 | A1 | 3/2009 | Jain |
| 2009/0106152 | A1 | 4/2009 | Dill |
| 2009/0119209 | A1* | 5/2009 | Sorensen ............. G06Q 20/102 705/40 |
| 2009/0265272 | A1 | 10/2009 | Dill |
| 2009/0272796 | A1 | 11/2009 | Ong |
| 2010/0042538 | A1 | 2/2010 | Dheer et al. |
| 2010/0145860 | A1 | 6/2010 | Pelegero |
| 2010/0250436 | A1 | 9/2010 | Loevenguth et al. |
| 2010/0274669 | A1 | 10/2010 | Carlson |
| 2011/0060684 | A1 | 3/2011 | Jucht |
| 2011/0093386 | A1 | 4/2011 | Phillips et al. |
| 2011/0208600 | A1 | 8/2011 | Aharoni |
| 2011/0208659 | A1 | 8/2011 | Easterly |
| 2011/0264583 | A1 | 10/2011 | Cooper |
| 2011/0270757 | A1 | 11/2011 | Hammad |
| 2012/0016799 | A1 | 1/2012 | Killian et al. |
| 2012/0041876 | A1 | 2/2012 | Nosek et al. |
| 2012/0317028 | A1 | 2/2012 | Ansari |
| 2012/0123940 | A1 | 5/2012 | Killian |
| 2012/0246080 | A1 | 9/2012 | Bajan |
| 2013/0191290 | A1 | 7/2013 | Glendenning |
| 2013/0226799 | A1 | 8/2013 | Raj |
| 2015/0073982 | A1 | 3/2015 | Prabhu |
| 2015/0120556 | A1 | 4/2015 | Brickell |
| 2015/0213440 | A1 | 7/2015 | Occari |
| 2015/0363752 | A1 | 12/2015 | Kimberg |
| 2016/0260094 | A1 | 9/2016 | Jia |

FOREIGN PATENT DOCUMENTS

| | | |
|---|---|---|
| KR | 20020031701 | 5/2002 |
| KR | 20070092391 | 9/2007 |
| WO | WO 2001/43084 A2 | 6/2001 |
| WO | WO 2001/065502 A2 | 9/2001 |
| WO | WO 2003/075131 A2 | 9/2003 |
| WO | WO 2003/075192 A1 | 9/2003 |
| WO | WO 2007/056274 A2 | 5/2007 |
| WO | WO 2009/003030 A2 | 12/2008 |
| WO | WO 2009/133116 A1 | 11/2009 |

OTHER PUBLICATIONS

Weiss, B. I. (2002). Check and ACH fraud: Seven points of attack. AFP Exchange, 22(1), 58-61. Retrieved from https://dialog.proquest.com/professional/docview/226001112?accountid=131444 on Sep. 7, 2022 (Year: 2002).*
Reexamination Decision, dated Mar. 30, 2020, issued in corresponding Chinese Patent Application No. 010-88091921 (24 pp.).
Third Office Action, dated Apr. 13, 2020, issued in corresponding Chinese Patent Application No. 010-88091921 (6 pp.).
2nd Notification of Office Action, in Chinese application 201410640355.7, dated Aug. 16, 2019 (with translation) (17 pages).
American Express Global Credit Authorization Guide ISO 8583: 1993 (Version 1)—Apr. 2011.
Decision of Rejection in Chinese Application No. 201380026008.9, and English Translation thereof, dated Nov. 2, 2018 (10 pages).
Examination Report No. 1 from IP Australia, in Australian Patent Application No. 2013235387, dated Aug. 25, 2017 (3 pages).
Examination report No. 1 in Australian Patent Application No. 2014256396; dated Sep. 26, 2019 (7 pages).
Examination report No. 1 in Australian Patent Application No. 2018220030; dated Sep. 27, 2019 (3 pages).
Examination report No. 3 for Australian Application No. 2013235387; dated Aug. 8, 2018 from Australian Patent Office; pp. 1-5.
Examiner Search Report for Canadian Application No. 2,867,697, dated Jan. 9, 2019 (3 pages).
Extended European Search Report for Application No. 14193092.5, dated Mar. 20, 2015 (10 pages).
First Notification of Office Action from State Intellectual Property Office of China, in Chinese Patent Application No. 201380026008.9, dated Oct. 8, 2016, with English translation (41 pages).
First Office Action in Chinese Application No. 201410640355.7, and English translation thereof, dated Jan. 11, 2019 (14 pages).
International Search Report and Written Opinion for International Application PCT/US2013/032130, dated Jun. 5, 2013 (16 pages).
International Standard: ISO 8583-1: Financial transaction card originated messages-Interchange message specifications—Part 1: Messages, data elements and code values, Jun. 15, 2003.

(56) References Cited

OTHER PUBLICATIONS

Notice of Reexamination in Chinese Patent Application No. 201380026008.9; dated Oct. 24, 2019 (20 pages) (with translation).
Notice of Second Examination Opinion from State Intellectual Property of the Peoples Republic of China, in Chinese Patent Application No. 201380026008.9, dated May 15, 2017, with English translation (48 pages).
Payformance offers further fraud protection to corporations through support of universal payment identification code (UPIC). (Oct. 16, 2006). Business Wire Retrieved from http://dialog.proquest.com/professional/docview/671160771?accountid=142257 Year: 2006).
POS Check Service—Electronic Check Conversion. Visa U.S.A., Jun. 2007 (4 pages).
Preliminary Office Action issued in BR112014023264-4 issued by Brazilian Patent Office; dated Dec. 26, 2019, and translation thereof (9 pages).
Preliminary opinion from the European Patent Office, in European Application No. 13 763 868.0; dated Oct. 4, 2019 (15 pages).
Press Release: "MasterCard, Visa and American Express Propose New Global Standard to Make Online and Mobile Shopping Simpler and Safer," http://newsroom.mastercard.com/press-releases/mastercardvisaand-american-express-propose-new-9lobal-standard-to-make-online-and-mobile-shopping-simpler-andsafer/, Oct. 1, 2013 (2 pages).
Results of Substantive Examination from Mexican Institute of Industrial Property, in Mexican Patent Application No. MX/a/2014/013530 issued Nov. 17, 2017, with English translation (13 pages).
Results of Substantive Examination from Mexican Institute of Industrial Property, in Mexican Patent Application No. MX/a/2014/013530 issued May 12, 2017, with English translation (12 pages).
Results of Substantive Examination from Mexican Institute of Industrial Property, in Mexican Patent Application No. MX/a/2014/011114 issued Jan. 16, 2017, with English translation (4 pages).
Search History for International Application PCT/US2013/032130, dated May 20, 2013 (3 pages).
Examination Report No. 2, dated Feb. 24, 2020, issued by the Australian Patent Office in corresponding Australian Patent Application No. 2018220030 (6 pp.).
Search Report, dated Apr. 16, 2020, issued by the Brazilian Patent Office in corresponding Brazilian Patent Application No. BR102014028305-6 (9 pp.).
Examination Report, dated Feb. 20, 2020, issued by the Indian Patent Office in corresponding Indian Patent Application No. 8214/DELNP/2014 (7 pp.).
Examination Report No. 3, dated Sep. 2, 2020, issued by the Australian Patent Office in corresponding Australian Patent Application No. 2018220030 (7 pp.).
First Examination Report, dated Jul. 20, 2020, issued by the Indian Patent Office in corresponding Indian Patent Application No. 3249/DELNP/2014 (7 pp.).
Office Action dated Dec. 6, 2021, in Canadian Application No. 2,870,844 (3 pages).
Examination Report dated Nov. 11, 2021, in counterpart Australian Patent Application No. AU 2020239756.
Examination Report dated Nov. 26, 2021, in counterpart Australian Patent Application No. AU 2020267193.
Examination Report in counterpart Australian Application No. 2020239756 dated Jul. 20, 2022 (6 pages).
Examination Report in counterpart Brazilian Application No. 1020140283056 dated Jun. 7, 2022 (7 pages, translation included).
Examination Report in counterpart Australian Application No. 2020239756 dated Oct. 5, 2022 (4 pages).

* cited by examiner

300

| | | |
|---|---|---|
| Message Type | 4 | 0200 – request message<br>0210 – response message |
| Primary Bit Map | 64 bits | Identifies each data element present (1-64) |
| Secondary Bit Map | 64 bits | Identifies each data element present (65-128) |
| DE2 | 19 | Constructed PAN |
| DE3 | 6 | 312000 – balance inquiry from checking |
| DE4 | 12 | Transaction amount – all zeros |
| DE7 | 10 | Transmission Date and Time |
| DE11 | 6 | System Trace Audit Number |
| DE12 | 6 | Local Transaction Time |
| DE13 | 4 | Local Transaction Date |
| DE15 | 4 | Settlement Date |
| DE32 | 11 | Acquiring Institution ID Code |
| DE37 | 12 | Retrieval Reference Number |
| DE39 | 2 | Response Code |
| DE41 | 8 | Card Acceptor Terminal ID |
| DE43 | 40 | Card Acceptor Location |
| | 23 | Street Address |
| | 13 | City |
| | 2 | State |
| | 2 | Country |
| DE48 | 25 | Merchant Name |
| DE49 | 3 | Currency Code |
| DE54 | 120 | Additional Amounts on response |
| DE58 | 11 | National Point-of-Service Condition Code |
| DE63 | 50 | NYCE Data |
| | 2 | Byte Map |
| | 6 | Pseudo Terminal |
| | 3 | Issuer Network ID |
| | 3 | Acquirer Network ID |
| DE96 | 8 | Security code on request |
| DE102 | 28 | Account ID 1 |
| DE122 | 11 | Sponsor Bank ID |

304 — points to DE2 row
323 — points to DE102 row

FIG. 3

SYSTEMS AND METHODS FOR REAL-TIME ACCOUNT ACCESS

CROSS-REFERENCE TO RELATED APPLICATIONS

This application is a continuation of U.S. patent application Ser. No. 16/715,818, filed Dec. 16, 2019, which is a continuation of U.S. patent application Ser. No. 13/835,452, filed Mar. 15, 2013, now U.S. Pat. No. 10,552,807, which claims the benefit of U.S. Provisional Application 61/612,897, filed Mar. 19, 2012, the contents of all of which are incorporated herein by reference in their entireties.

FIELD OF DISCLOSURE

The disclosed embodiments are generally directed to systems and methods for real-time account access.

BACKGROUND

Network processing infrastructures, such as EFT (Electronic Funds Transfer) network processing, are used to process payments from traditional credit or debit card transactions. EFT enables quick provisioning of account information and other related information for purchases and other purposes. For example, when a cardholding customer seeks to purchase an item at a store, the customer will generally hand her card to the merchant and the merchant will swipe the card through a magnetic stripe machine to read the card information, including the card number. Card numbers are typically 13-19 digits long, and uniquely identify the user's credit or debit account.

After the card number is received by the merchant, the merchant sends the card number, along with other information associated with the transaction, such as price, date, time, location, cardholder name, to a payment network. The payment network will typically route that information to the appropriate card issuer based on the card number. The first digits typically identify the "issuer," that is, the entity, such as a company, that issued the card. So, for example, a card number beginning with a '4,' e.g., 4000 1234 5678 9012, will typically identify VISA as the card provider/issuer. Each issuer typically has a numeric identifier that is associated with and represents their cards.

The appropriate issuer, for example, a credit or charge card company, will then typically consult its records to determine the appropriate account and verify whether that account contains sufficient funds or credit to make a transaction (e.g., a purchase). The result of this determination will typically be returned to inform the merchant whether the user is able to purchase the item. The entire process, from the original capturing of the card data to the response providing funds verification may happen in a relatively short period of time. In some situations, this process happens in real-time or in near real-time.

However, in some situations, a card number for accessing a customer's account is not available. For example, if a customer decides to pay by check, the merchant must capture the RTN (Routing Transit Number) for the bank that issued the check and the customer's personal account number. The merchant must then use a system such as the Automated Clearing House (ACH) to process the payment. ACH typically operates in batches and thus the process to authorize a purchase can take much longer than a card-based transaction. Thus, using ACH increases the amount of time for the merchant to acquire the funds promised. ACH use further includes a possibility of accepting payments that are later found to be uncollectable (also known as a "bounced check").

In other situations, a customer may not wish to provide his account details to the merchant, for reasons of privacy or otherwise. This can cause issues in payment acceptance because a user will typically need to provide his payment card information. Without this information, the merchant is typically unable to accept payment.

Still in other situations, such as with commercial accounts, there is no card number that can be used to effect purchases. Thus, commercial purchases may need to rely on the ACH system to make purchases, which (as mentioned before) Is slow, costly, and inefficient.

It would thus be desirable to provide for improved systems and methods for processing transactions to accounts using existing network processing infrastructure with real-time or near real-time access. It would also be desirable for these systems and methods to support routing, processing, settling, and reporting of payment transactions. Advantages of such systems and methods include increased speed for transaction processing, reliable account management and accounting, and/or a drop in uncollectable accounts. Further advantages will be recognized by one skilled in the art after considering the remainder of the disclosure.

SUMMARY OF THE DISCLOSURE

In accordance with example embodiments, a method for processing payment transactions by a device (such as a payment network device) comprises receiving transaction requests from an acquirer and determining that the transaction request represents a transaction that does not require a card or account number. The method further comprises selecting an accounting processor based on the contents of the transaction request, providing the transaction request to the selected accounting processor, and receive a response from the accounting processor. In some example embodiments, the response received may comprise at least one of a selected account for the transaction request based at least in part on the contents of the transaction request or an account balance associated with the selected account. The method further comprises, approving, denying, or taking further action on the transaction request. Similarly, in some example embodiments, a computer system comprises at least one processor and a memory containing instructions that, when executed by the processor, cause the processor to perform the operations of this method.

In accordance with example embodiments, a method for processing payment transactions by an accounting processor device comprises receiving, at the accounting processor device (e.g., from a network device), a transaction request determined by the network device to not require a card or account number. The method further comprises selecting an account for the transaction request based at least in part on the contents of the transaction request, determining a balance of the selected account, and generating a response based on the contents of the transaction request and the balance. The response comprises information for determining whether to approve or deny the transaction request. Similarly, in some example embodiments, a computer system comprises at least one processor and a memory containing instructions that, when executed by the processor, cause the processor to perform the operations of this method.

In accordance with example embodiments, a method for processing a payment transaction by an acquirer processor device comprises a step of receiving information using at least one computer system for conducting a payment transaction. In some example embodiments, the information does not include a card or account number. The method further comprises the computer system generating a transaction request including at least one identifier based on the information, sending the transaction request to a payment network for processing, and receiving at least one response to the transaction request based on at least one account associated with the identifier. Similarly, in some example embodiments, a computer system comprises at least one processor and a memory containing instructions that, when executed by the processor, cause the processor to perform the operations of this method.

It is to be understood that both the foregoing general description and the following detailed description are examples and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments of the disclosed embodiments and together with the description, serve to explain principles of the disclosed embodiments.

FIG. 3 is an example message format 300 for use with in accordance with some embodiments;

DETAILED DESCRIPTION

Reference will now be made in detail to the disclosed embodiments, examples of which are illustrated in the accompanying figures. Wherever possible, the same reference numbers will be used throughout the drawings to refer to the same or like parts.

The disclosed embodiments employ multiple modes of operation to process a payment transaction (also referred to herein as a "transaction"). A first mode of operation is known as "native mode." In native mode, a message (also referred to herein as a transaction request or payment request) may be passed between devices. The message, in some embodiments, may conform to or be based upon the ISO 8583 message. The ISO 8583 standard defines a format for messages so, among other things, different systems can exchange data and effect transactions.

A native mode message allows a transaction to utilize existing payment card transaction channels even without a payment card. For example, an ISO 8583 message could be used to effect these transactions. In some embodiments, the native mode system would construct one of these messages using particular information. At least part of this information may signify that the message is going to be used for a purpose different from its ordinary purpose (i.e. different from a payment card transaction).

Another mode of operation is known as "non-native mode" or "X-REF mode." This mode may be similar to the above native mode but with messages constructed in a different manner. In some embodiments, a data store or database may be consulted to determine an account number based on data stored in the messages. Both of these modes will be described later with respect to at least FIGS. 3 and 4.

Both modes of operation enable the conducting of a transaction that does not require a card number or account number. For example, in the situation of a user who does not wish to disclose her payment card number or account number to a merchant, a transaction can still be processed, using the above modes of operation.

Figure 1:
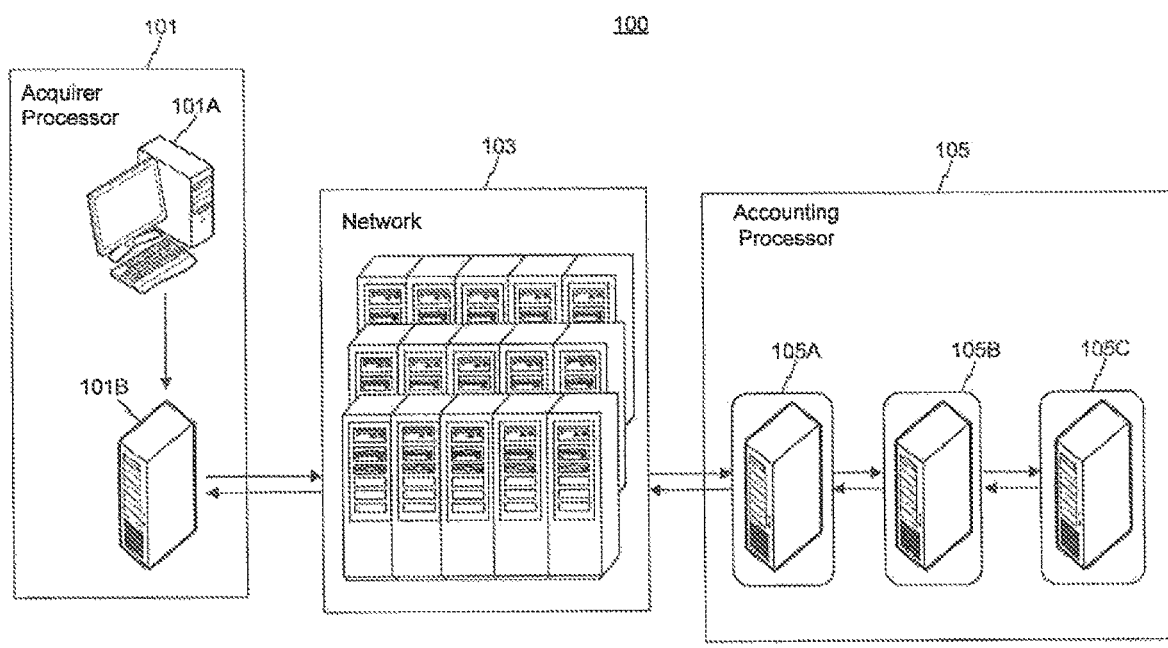
FIG. 1 is an example network 100 in accordance with some embodiments.

FIG. 1 is a representation of an example network 100 for use with the disclosed systems and methods. Network 100 contains, in some embodiments, at least one of Acquirer Processor 101, at least one of Network 103, and at least one of issuer 105. These individual elements may be implemented, in some embodiments, using one or multiple computer systems as will be referenced with respect to FIG. 5. The particular components or devices used to implement each of these elements may vary.

Acquirer Processor 101, in some embodiments, includes a Front-End System 101A and a Back-End System 101B. Front-End System 101A is used to capture payment details. In some embodiments, Front-End System 101A may be a merchant device for capturing data—including a cash register, an online shopping cart system, a credit card reader, a check-scanning machine (e.g. for reading MICR data), a computer, or the like. In other embodiments, Front-End System 101A is operated by an acquiring bank. This may be, for example, the bank that processes payments for a merchant who has accepted payment details from a customer.

In some embodiments, Back-End System 101B can be a system for processing transactions passed through Front-End System 101A. Back-End System 101B can be run by the same acquiring bank that runs Front-End system 101A. In other embodiments Back-End System 101B may be run by a different entity. Back-End System 101B, in some embodiments, can generate a transaction request based in part on the payment details captured by Front-End System 101A. Back-End System 101B can then send this transaction request to a Network 103 for processing. In some embodiments, Front-End System 101A and Back-End System 101B may be a single distinct computer system. In others, they may be multiple computer systems. In further embodiments, Front-End System 101A and Back-End System 101B may be any of an ATM/ATM Processor, a merchant/POS Processor, a Bill Pay Merchant/Biller Processor, an Internet merchant/Internet merchant Processor, or the like.

In some embodiments, Front-End System 101A or Back-End System 101B may acquire customer credentials in order to effect a purchase or other transaction. In some embodiments, these acquired credentials may be used to create a constructed value. The constructed value may comprise information identifying a unique deposit account or other kind of account. For example, accounts may comprise any of a deposit account, a checking account, a debit account, a credit account, a brokerage account, a business account, a personal account, or the like. One of ordinary skill will recognize that one particular type of account is not necessarily essential to the disclosed embodiments.

In some embodiments, the constructed value may be unique. For example, in constructing a payment request including a constructed value, the constructed value could refer only to the institution holding the account, with other information in the payment request referring to the particular account. In some embodiments, this constructed value may include any of a number of data types, including (but not limited to) a special value indicating the presence of a constructed value, identifiers (e.g., pre-agreed upon identifiers) for an account or institution (such as an International Bank Account Number (IBAN—used primarily outside of the United States), a Routing Transit Number (RTN or R&T Number—used primarily inside of the United States), a Canadian transit number, a bank code, a branch code, a sort code, or any other identifier that at least partially identifies the account or the institution that holds it), a time and date for the payment request, or the like.

In some embodiments, the constructed value may include a number resembling a deposit account number, a card account number, or another type of account number (also known as a Primary Account Number (PAN)). PANs may comply with or be based on ISO 7812, which may, in part, assign specific first digits of PANs to specific issuers.

In still other embodiments, the constructed value and/or the payment request may include a number of other identifiers that can uniquely identify a customer or his accounts. For example, a customer's email address, phone number (cellular/mobile, work, home, pager, etc.), username, social network identity (such as a Facebook or Twitter account), or the like, may be included. Additionally, these identifiers can be used to generate another identifier (such as a hexadecimal or encrypted value) for use in the payment request. Further, other identifiers may be used in some embodiments.

Network 103 can be an Interbank Network (such as NYCE, INTERAC, or the like). Interbank Networks allow money systems (such as ATMs or payment terminals) to access deposit or other accounts. In some embodiments, Network 103 enables the use of ATM cards issued by a bank to be used at a point of sale through an EFTPOS (Electronic Fund Transfer at Point Of Sale) system. Rather than operating as a credit card transaction, which would typically need to go through a credit card issuer system, an EFTPOS transaction could be received by Network 103 and routed to the appropriate bank holding the account. Network 103 can be national, international, or both. Network 103, in some embodiments, may be configured to send messages to Accounting Processor 105, to request Accounting Processor 105 to move funds associated with a transaction.

Accounting Processor 105 represents systems used in processing payment transactions. For example, in some embodiments, Accounting Processor 105 may be a computer system that receives a transaction request, attempts to process the transaction request (e.g., by debiting or crediting accounts referenced in the request), and provides the status of the attempt to process the transaction request. Accounting Processor 105 may be operated by, for example, an issuer, a bank, a credit union, a commercial bank, a company operating deposit accounts, or the like. Accounting Processor 105 may differ based on, for example, which kind of transaction is being attempted. For example, a transaction on a credit card not tied to a particular bank could be processed at a card Issuer's servers. However, a debit card transaction that is tied to a deposit account at a bank may be processed at least in part by the bank. In any case, the group or organization operating Accounting Processor 105 typically stores information on accounts, such as lines of credit, account balances, credit worthiness, payment history, and the like. In some embodiments, the accounts managed by Accounting Processor 105 are known as Demand Deposit Accounts (DDAs). Accounting Processor 105 may deposit funds into accounts, withdraw funds from accounts, request balances of accounts, or perform other accounting transactions when requested by, for example, Network 103.

In some embodiments, Acquirer Processor 101, Network 103, and/or Accounting Processor 105 may employ a set of rules for initiating and processing transaction requests, such as EFTPOS transactions. In some embodiments, any or all of these devices may be configured to comply with these rules. For example, Accounting Processor 105 may be configured to move funds between accounts when requested by Network 103. Accounting Processor 105 may also be configured to process credit transactions, debit transactions, microtransactions, or other transactions, when requested by Network 103 and/or Acquirer Processor 101. Accounting Processor 105 may also be configured to provide account balance or status (e.g., open, closed, suspended) when requested by Acquirer Processor 101. Accounting Processor 105 may also be configured to settle transactions at the end of a business day. One of ordinary skill will recognize that other rules for processing transactions are possible as well.

Figure 2:
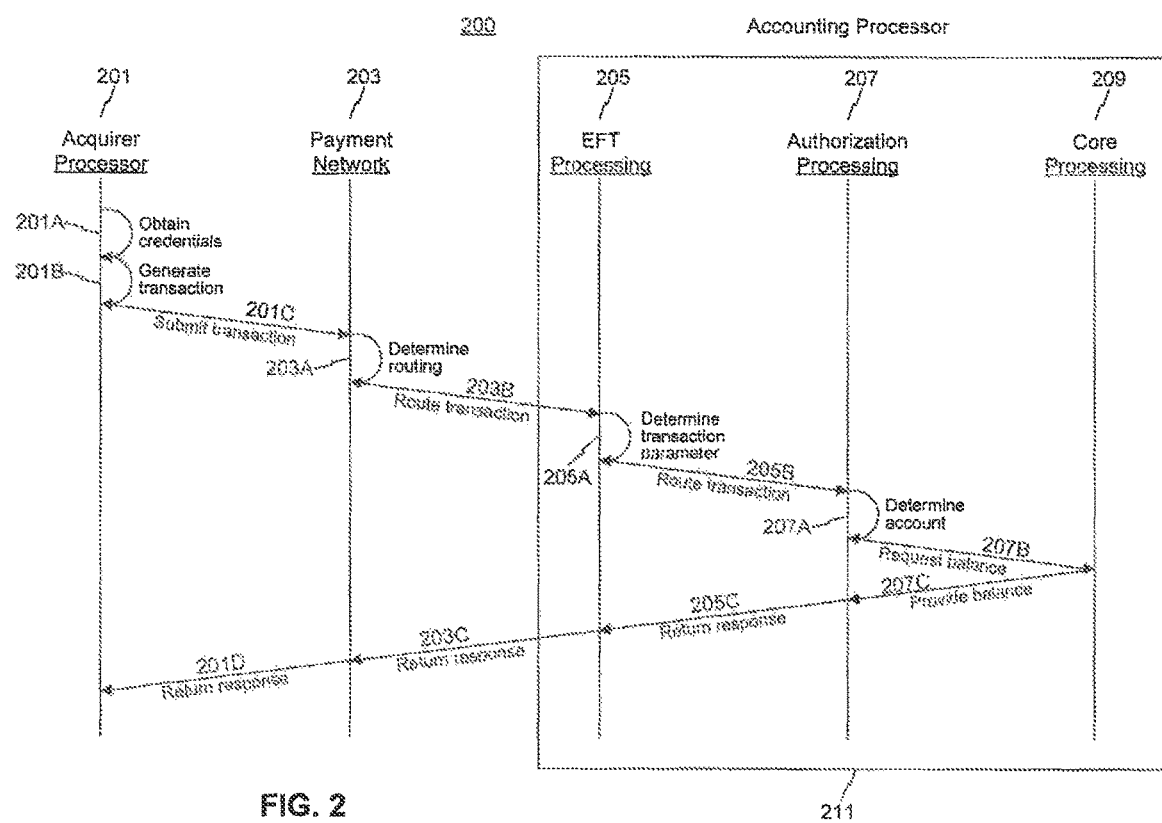
FIG. 2 is an example network communication diagram 200 displaying some portions of communications usable in accordance with some embodiments.

FIG. 2 discloses an example method 200 for implementing portions of the disclosed systems and methods. Method 200 begins with step 201A with Acquirer Processor 201 receiving credentials from a customer or purchaser. These credentials (or "payment details") could include payment account information—such as an RTN (Routing Transit Number), an account number, a credit card number, a payment card number, a debit card number, an identifier tied to an account, a pseudo-identifier that when referenced in a data store or database resolves to an account number, or the like. The payment details, in some embodiments, can uniquely represent a customer's deposit, credit, debit, or other account. For example, payment details can comprise a customer's account number. The payment details, in still other embodiments, can comprise another unique identifier that is associated with customer's account. For example, the payment details can comprise a pseudo-identifier made of numeric, hexadecimal, or another coding scheme, to identify the customer's account. In other embodiments, the payment details can comprise a pseudo-card number or a constructed value. The first few digits of the constructed value could be a '59,' but other values and constructions are possible as well. A '59' may be used to signify that the characters following it contain an ABA value. These values may be provided by the customer attempting to purchase a good or make a transaction, may be generated by Acquirer Processor 101 based on information received from the customer, or the like.

In still other embodiments, the constructed value and/or the payment details may include a number of other identifiers that can uniquely identify a customer or account. For example, a customer's email address, phone number (cellular/mobile, work, home, pager, etc.), username, social network identity (such as a Facebook or Twitter account), or the like. Additionally, these identifiers can be used to generate another identifier (such as a hexadecimal or encrypted value) for use in the payment request. Further, other identifiers may be used in some embodiments.

In step 201B, Acquirer Processor 201 generates a transaction request. In some embodiments, these transaction requests will be in the form of a balance inquiry transaction. A balance inquiry transaction may occur when an entity operating Acquirer Processor 201 (e.g. a merchant, a bank, or the like) desires to find out whether the customer's account contains the funds required to make a purchase. In other embodiments, these transaction requests will be in the form of debiting or crediting instructions. In some embodiments, transaction requests generated in step 201B can be in the form of, or based on, the ISO 8583 message standard, as will be described later with respect to FIGS. 3 and 4. Such messages may also contain information such as the type of transaction, the amount of the transaction, the date, the time, the location information, or the like. In step 201C, Acquirer Processor 201 can submit the generated transaction request to Network 203.

In some embodiments, Network 203 (which, in some embodiments, may be implemented as described above with respect to Network 103) is chosen by Acquirer Processor 201 for processing transactions. Network 203, in some embodiments, can be an Interbank Network (such as NYCE, INTERAC, or the like) as mentioned previously. Network 203 may be enabled to provide proper routing of received transaction requests. This can be done, for example, by determining the RTN and/or other information about the payment type. This is represented in steps 203A and 203B, and can be done in part by determining the existence of a particular value in the transaction request. In some embodiments, this may involve determining the existence of the numbers '59' (or another particular piece of data) at a particular position in the transaction request. A '59' signifies that the characters following it contain an ABA value.

In other embodiments, for example, those involving a pseudo identity of the user (such as usernames, social network identities, phone numbers, or e-mail addresses), Network 203 may determine the appropriate routing by consulting a data store. After determining the existence of a particular value in the transaction request, Network 203 may determine that the characters following the particular value represent an RTN, and may route the transaction as represented in step 203B to EFT Processing 205. In some embodiments, step 203B may be performed shortly after a routing process (e.g., step 203A) is performed. In other embodiments, the process of routing in step 203B may be performed on a batch or bulk basis. For example, if the transaction was submitted to Payment Network 203 during the afternoon of a first business day (e.g., step 201C), determining the proper routing in step 203A and/or routing that transaction request in step 2038 may be performed later that evening, along with determining and routing of other transaction requests received the same day.

EFT Processing 205, as well as Authorization Processing 207 and Core Processing 209, can, in some embodiments, be part of a broader Accounting Processor system 211. (In some embodiments, Accounting Processor system 211 may be implemented as described above with respect to Accounting Processor 105.) In FIG. 2, these Processing systems are represented as three separate systems, but any or all may be implemented on a single computer or multiple computers. In step 205A, EFT Processor 205 may determine the transaction parameters present in the forwarded transaction request in order to determine the proper Authorization Processing system 207 to send the request to for processing. Again, this may involve determining the routing based on a particular value that is present in the transaction request (such as the RTN).

Once Authorization Processing 207 receives the transaction request in step 205B, the process continues to step 207A for account determination. Authorization Processing 207 may then determine the proper account. This could be accomplished by inspecting the transaction request (and extracting an account number), consulting a cross-reference database (not pictured) to determine the proper account number/identifier based on information in the transaction, or the like. Once this account number/identifier is determined, a request may be sent to Core Processing 209 with that account number/identifier. This request, in some embodiments, comprises a request for the current balance of the account referenced by that account number/identifier. In other embodiments, the request can comprise other operation requests, such as debiting, crediting, or the like.

When Core Processing 209 receives the request in step 207B, it may take some or all of a number of actions. Core Processing 209 may provide the balance associated with the account referenced in the transaction request back to Authorization Processing 207. Core Processing 209 may debit or credit based on the amount of money referenced in the transaction request, and provide the new balance (i.e. after the debit/credit) back to Authorization Processing 207. In other embodiments, based on the particular transaction request, Core Processing 209 may respond differently, such as with an indication that the available balance is less than (or more than) the amount in the transaction request; an indication that the ledger balance is less than (or more than) the amount in the transaction request; an indication of the health of the account (such as whether the account is open and/or in good standing; an indication of how long the account has been open for; an indication of any negative history associated with the account, average balance ranges, or the like); the account owner's name, address, date the account was opened, or other information; or the like. Any or all of these items may make up a part of the response by Core Processing 209 in step 207C.

Upon receiving the response in step 207C, Authorization Processing 207 may determine, based on the content of the request, whether the transaction should be approved or denied. For example, if the response in 207C indicates that the account has less money than is required to effect the purchase transaction referenced by the original transaction request, Authorization Processing 207 may deny the transaction, and may construct a denial message for sending back to Acquirer Processor 201, via steps 205C, 203C, and 201D. If the account has enough money to cover the transaction, Authorization Processing 207 may approve the transaction, and send back an approval message via the same steps.

Authorization Processing 207 may also send back other messages, such as messages indicating the amount of money available in an account, a status of the account (such as whether the account is open or closed), an owner of the account, or a request for more information from the user. Other messages may also be sent, as will be appreciated by those having ordinary skill in the art.

FIG. 3 is an example message format 300 for use with the disclosed systems and methods, in accordance with disclosed embodiments. Messages based on message format 300, in some embodiments, are used to transmit data between the devices in FIGS. 1 and 2. In some embodiments, the data elements in message format 300 may be based on the ISO 8583 message standard. Any of the revisions of this standard may be used, as well as other standards. In other embodiments, other messages may be used and the particular data sizes and fields in FIG. 3 may vary. Furthermore, in some embodiments, the particular data fields in FIG. 3 may contain data as described in FIG. 3. For example, the DE12 data element may contain 6 bytes indicating the local time at a terminal where a transaction is taking place.

In some embodiments, a message as described with respect to message format 300 could include DE2 304 (i.e. "Data Element 2" 304) storing a "constructed PAN." As mentioned above, PANs are generally used in the art to represent credit card numbers. PANs may comply with or be based on ISO 7812, which defines which card issuers use the first digits of the PAN. For example, a '4' in the first position of the PAN may signify VISA, while a value of '53' may signify MasterCard.

In some embodiments, the PAN can be constructed of multiple portions. The PAN may comprise a pseudo card number, which may be constructed based on pre-agreed identifiers for an account (e.g. the above-mentioned RTN or IBAN). In some embodiments, a '59' is used in the first two spaces to signify that the PAN is a constructed value. A nine-digit RTN or other identifier may follow, and following that would be an eight digit value indicating time and date. This mode of operation has been previously referred to in this disclosure as "native mode."

In order to identify the particular account used by the customer, other portions of message 300 can store the actual account number. For example, in some embodiments, the user's particular deposit account could be stored in another portion of the message; for example, in DE102 323.

In other embodiments, the PAN can be constructed as a pseudo-identifier. That is, the PAN itself could be constructed as a cross-reference to an account number. So, upon receiving the PAN, an issuing bank could consult a table, database, or other data store, in order to determine the account number associated with the pseudo-identifier. The account number could then be used to debit the account or perform other actions. In some embodiments, the PAN may be constructed as a single- or limited-use string of numbers (for example, composed of 19 decimal digits or hexadecimal numbers), a hash of the account number, an encrypted string representing the account number, or the like. This mode of operation has been previously referred to in this disclosure as "non-native mode" or "X-REF mode."

After identifying the account associated with either the account number stored in message 300 or the pseudo-identifier stored in 300, an issuer would be able to determine the proper account and process payment transactions. For example, this could include returning a balance, authorizing a payment, or the like, as previously mentioned with respect to FIG. 2.

Figure 4:
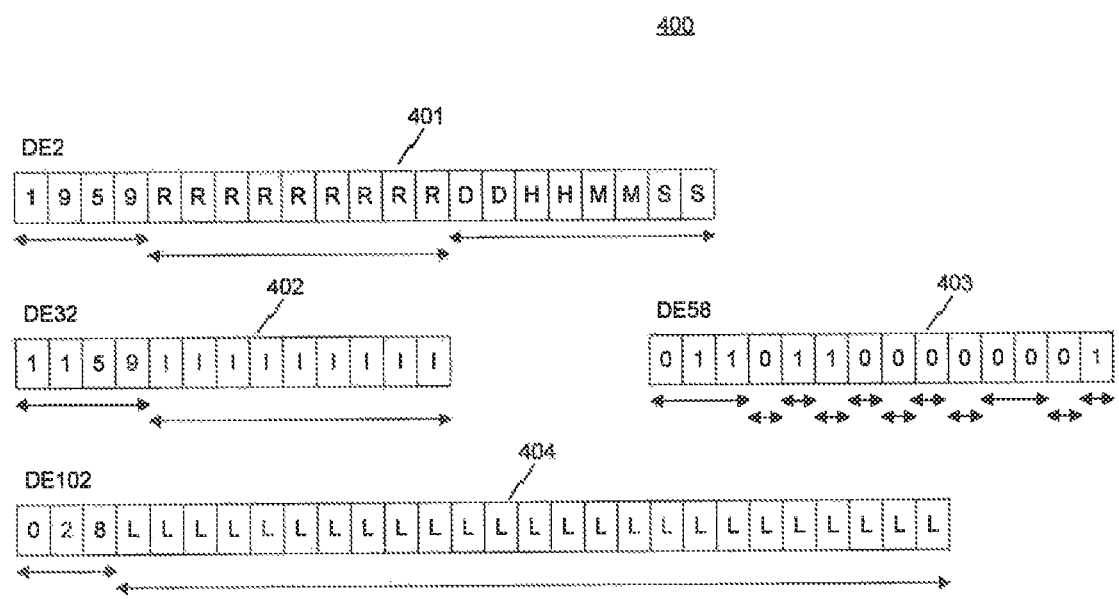
FIG. 4 is an example diagram 400 of some data fields for use with in accordance with some embodiments.

FIG. 4 represents some data elements that make up the message described in FIG. 3 above. To start, Data Element 2 (DE2) is represented as 401 in FIG. 4. In some embodiments, DE2 is used to store a constructed PAN. The first two spaces indicate how many characters will follow (in example FIG. 4, this is '19'). Thus, DE2 is 21 characters long in total, including the '19' at the beginning. Each of these characters, in some embodiments, may be a single digit (i.e. 0-9); however, in other embodiments, a larger character set is usable (e.g. hexadecimal code). After the '19,' a PAN will follow. In example FIG. 4, a constructed PAN is represented as characters 3-21 in DE2. A '59' signifies that the characters following it contain an ABA value. (However, other characters, including other numbers, letters, or the like, may be used to signify that the following value is an ABA value.) The 'R' characters represent the previously mentioned RTN, and the string 'DDHHMMSS' represents the time of the transaction (i.e. Day, Hour, Minute, Second).

Data Element 32 (DE32) 402, in some embodiments, is used to identify the Acquiring institution, for example, Acquirer Processor 101, in order to properly route the response back to sending party. DE32 enables a network, such as Network 103, to recognize transactions as coming from a particular acquirer, such as a merchant. The first two digits ('11') signify the length of the data, and the second two digits ('59') represent that a non-card based transaction will take place. The final 9 'I' characters represent an institution ID, that is, the ID of the institution that originated the message.

Continuing to Data Element 52 (DE58) 403, this data element contains a number of bits signifying attributes of the transaction. In some embodiments, DE58 may be constructed as follows:

011 signifying the length of the field - in this case, 11 characters long
0 signifying whether a transaction was attended - in this case, not at a stand-alone terminal
1 signifying whether a merchant operated the terminal - in this case, that a merchant operated the terminal
1 signifying whether the transaction was made at a physical location associated with the acquirer institution - in this case, that the transaction was made at a device not at a location associated with the acquirer institution, such as at an ATM device not located at an associated bank's branch
0 signifying whether the customer is present - in this case, that the customer is not present
0 signifying whether a card is present - in this case, that the card is not present, and that the R&T number should be checked
0 signifying whether the merchant's terminal has "card retention" capability, e.g., the ability to keep a physical plastic card if instructed by an issuer (such as an ATM keeping a card in response to the issuer recognizing a stolen card) - in this case, that the merchant's terminal does not have this capability
0 signifying whether this is the first time that the transaction has been attempted, e.g., because the first attempt to process this transaction did not work properly - in this case, that this is not the first attempt at this transaction
0 signifying whether a security check was performed (e.g., whether a driver's license or other identification document was checked by a merchant) - in this case, that no security check was performed
00 signifying whether the terminal is an "administrative" terminal (e.g., a merchant terminal directly or indirectly operated by a merchant or cashier, such as a checkout line at a supermarket) or a "non-administrative" terminal (e.g., a non-merchant operated terminal, such as a stand-alone terminal operated by a customer, a website, an Automated Teller Machine, etc.) was used to effect the transaction request - in this case, that the terminal was a non-administrative terminal
1 signifying whether transaction data for this transaction was manually entered by a merchant (e.g., using a keypad) or automatically entered (e.g., using a magnetic card or other device to receive the transaction data)

However, other values are possible for each of the data elements, based on the individual characteristics of each transaction.

Moving on to Data Element 102 (DE102) 404, this data element may, in some embodiments, be used to signify the purchaser's account information. In the ISO 8583 specification, this is referred to as the "Account ID 1." In some embodiments, this may signify, as mentioned previously, the account data for the user's deposit account. As depicted in FIG. 4, DE102 consists of '028', signifying that a 28-character string will follow. In some embodiments, these 28 characters may consist of digits from the MICR (Magnetic Ink Character Recognition) line of a check given to the merchant by the customer.

Figure 5:
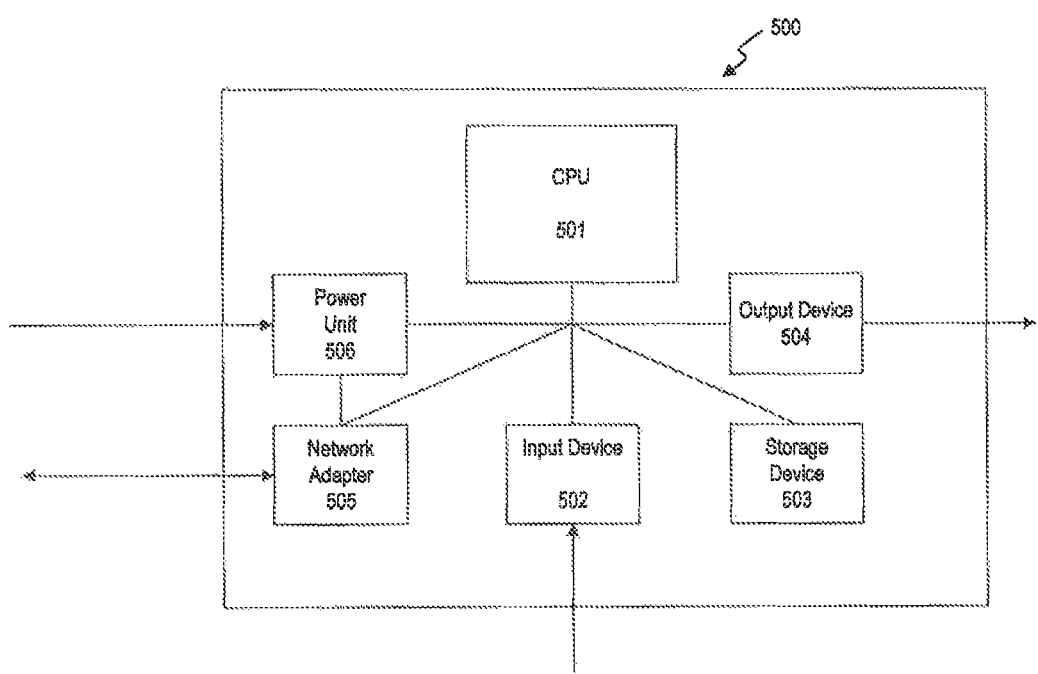
FIG. 5 is an example computer system 500 for use with in accordance with some embodiments.

FIG. 5 discloses an example computer system 500 for use with the disclosed systems and methods, in accordance with disclosed embodiments. Example computer system 500 may power any of the methods, systems, devices, or computer-readable media mentioned above, in addition to those disclosed in FIGS. 1-3.

In some embodiments, computer system 500 may be implemented as a cellular phone, a mobile device, a POS (point-of-sale) device, a server, a wireless device, or any other system that includes at least some of the components of FIG. 5. Computer system 500 contains a Central Processing Unit 501, which enables data to flow between the other components and otherwise manages the operation of the other components in computer system 500. CPU 501, in some embodiments, may be any of a general-purpose processor (such as an Intel- or AMD-branded consumer/business/enterprise processor), a special-purpose processor (for example, a graphics-card processor), or any other kind of processor that enables input and output of data.

Also part of Computer system 500 is Input Device 502. In some embodiments, Input Device 502 may be any device that enables a user or other entity to input data. For example, Input Device 502 could be a keyboard, a mouse, or the like. Input Device 502 can be used to control the operation of the other components of FIG. 5.

Computer system 500 also includes Storage Device 503. Storage Device 503 stores data that is usable by the other components in computer system 500, including data that has previously been referenced and referred to in FIGS. 1-4. Storage Device 503 may, in some embodiments, be implemented as any or all of a hard drive, temporary memory, permanent memory, optical memory, or any other type of permanent or temporary storage device.

Computer system 500 also includes Power Unit 506. Power Unit 506 provides the electricity necessary to power the other components in computer system 500. For example, in some embodiments, CPU 501 may need power to operate; Power Unit 506 can provide the necessary electric current to power this component.

Computer System 500 also includes Network Adapter 505. Network Adapter 505, in some embodiments, enables communication with other devices that are implemented in the same or similar way as computer system 500. Network Adapter 500, in some embodiments, may allow communication to and/or from a network such as the Internet; other networks are possible as well. Network Adapter 500 may be implemented using any or all of known or as-yet-unknown wired or wireless technologies (such as Ethernet, 802.11 a/b/g/n (aka Wi-Fi), cellular (e.g. GSM, CDMA, LTE), or the like).

Additionally, any of the components in FIG. 5 may be implemented as one or more of the illustrated components. For example, in some embodiments, CPU 501 may be implemented as any of multiple computer processors, a processor and a co-processor, or a single processor. For example, in some embodiments, Storage Device 503 may be implemented as any of Random Access Memory (RAM), Read-Only Memory, a hard drive, USB storage, a CD/DVD/Blu-Ray disk, or the like. The particular number of each component as illustrated in FIG. 5 is not controlling and a person skilled in the art will understand the appropriate number of each component for each particular implementation of the disclosed embodiments.

Other embodiments of the disclosed embodiments will be apparent to those skilled in the art from consideration of the specification and practice of the disclosed embodiments disclosed herein. It is intended that the specification and examples be considered as examples only, with a true scope and spirit of the disclosed embodiments being indicated by the following claims.

Furthermore, the disclosed embodiments may be implemented in part or in full on various computers, electronic devices, computer-readable media (such as CDs, DVDs, flash drives, hard drives, or other storage), or other electronic devices or storage devices.

What is claimed is:

1. A method for processing payment transactions via a network comprising:
   receiving an EFTPOS transaction request, the transaction request comprising a data structure, the data structure being in a native mode or a non-native mode;
   locating, based on the data structure being in a non-native mode, a pseudo-identifier in the data structure, the pseudo-identifier containing a portion indicating that the pseudo-identifier is not an account number or a card number;
   determining an accounting computer system based on the pseudo-identifier, the determining of the accounting computing system being based on the pseudo-identifier and an existence of the portion within the data structure;
   routing the transaction request to the accounting computer system;
   receiving a response from the accounting computer system, the response comprising information based on an account balance; and
   determining whether to approve or deny the transaction request based on the response.

2. The method of claim 1, the method further comprising selecting the accounting computer system based on information stored in a data store and the transaction request, wherein routing the transaction request to the accounting computer system is further based on the selecting of the accounting computer system.

3. The method of claim 1, the method further comprising:
   generating a notification based on the determination of whether to approve or deny the transaction request based on the response, the notification including information indicating whether the transaction request was approved or denied; and
   transmitting the notification to at least one of a payment network or an acquirer processor associated with the request.

4. The method of claim 1, wherein the pseudo-identifier comprises a limited use pseudo-identifier.

5. The method of claim 1, wherein the pseudo-identifier comprises data indicating the pseudo-identifier does not comprise an account number or a card number.

6. The method of claim 1, wherein the data structure comprises information signifying attributes of a transaction.

7. The method of claim 1, wherein the transaction request is received from a payment network as part of a batch operation.

8. The method of claim 1, wherein the transaction request is received from a payment system in an event triggered by the payment system receiving the transaction request from an acquirer system.

9. The method of claim 1, wherein the information based on the account balance indicates that a transaction is authorized or is unauthorized.

10. The method of claim 1, wherein the information based on the account balance comprises the account balance.

11. The method of claim 1, the method further comprising reconciling a transaction based on the determining whether to approve or deny the transaction request.

12. The method of claim 1, wherein the accounting computer system is associated with an issuer.

13. The method of claim 1, wherein the data structure comprises information uniquely identifying a user.

14. The method of claim 1, wherein the transaction request comprises at least one of:
   a request for a current balance;
   a request for whether at least one of an available balance or a ledger balance is more than, less than, or equal to an amount in the transaction request;
   a request for an account health indicator; or
   a request for information associated with a user.

15. The method of claim 1, the method further comprising:
transmitting a notification to an acquirer system via a payment network, the notification including a request for further information.

16. The method of claim 1, the method further comprising returning crediting a monetary amount to the account based on the transaction request.

17. The method of claim 1, wherein receiving a transaction request comprising receiving the transaction request at an Electronic Fund Transfer (EFT) system.

18. The method of claim 1, wherein the transaction request comprises digits of a magnetic ink character recognition.

19. A system for processing a payment transaction, comprising:
at least one processor; and
at least one memory containing instructions that, when executed by the at least one processor, cause the at least one processor to perform a method comprising:
receiving an EFTPOS transaction request, the transaction request comprising a data structure, the data structure being in a native mode or a non-native mode;
locating based on the data structure being in a non-native mode, a pseudo-identifier in the data structure, the pseudo-identifier containing a portion indicating that the pseudo-identifier is not an account number or a card number;
determining an accounting computer system based on the pseudo-identifier, the determining of the accounting computer system being based on the pseudo-identifier and an existence of the portion within the data structure;
routing the transaction request to the accounting computer system;
receiving a response from the accounting computer system; and
based on the response, performing one of:
approving the transaction;
denying the transaction; or
transmitting a request for further information associated with the transaction.

20. A method for processing payment transactions via a network comprising:
receiving an EFTPOS transaction request, the transaction request comprising a data structure, the data structure being in a native mode or a non-native mode;
locating based on the data structure being in a non-native mode, a pseudo-identifier in the data structure, the pseudo-identifier containing a portion indicating that the pseudo-identifier is not an account number or a card number;
determining an accounting computer system based on the pseudo-identifier, the determining of the accounting computer system being based on the pseudo-identifier and an existence of the portion within the data structure;
routing the transaction request to the accounting computer system;
receiving a response from the accounting computer system; and
based on the response, performing one of:
approving the transaction;
denying the transaction; or
transmitting a request for further information associated with the transaction.

* * * * *